Jan. 3, 1928.
H. W. JONKHOFF
1,654,814
COMMON TRUCK FOR TWO-LOADING PLATFORMS
Filed Aug. 21, 1925
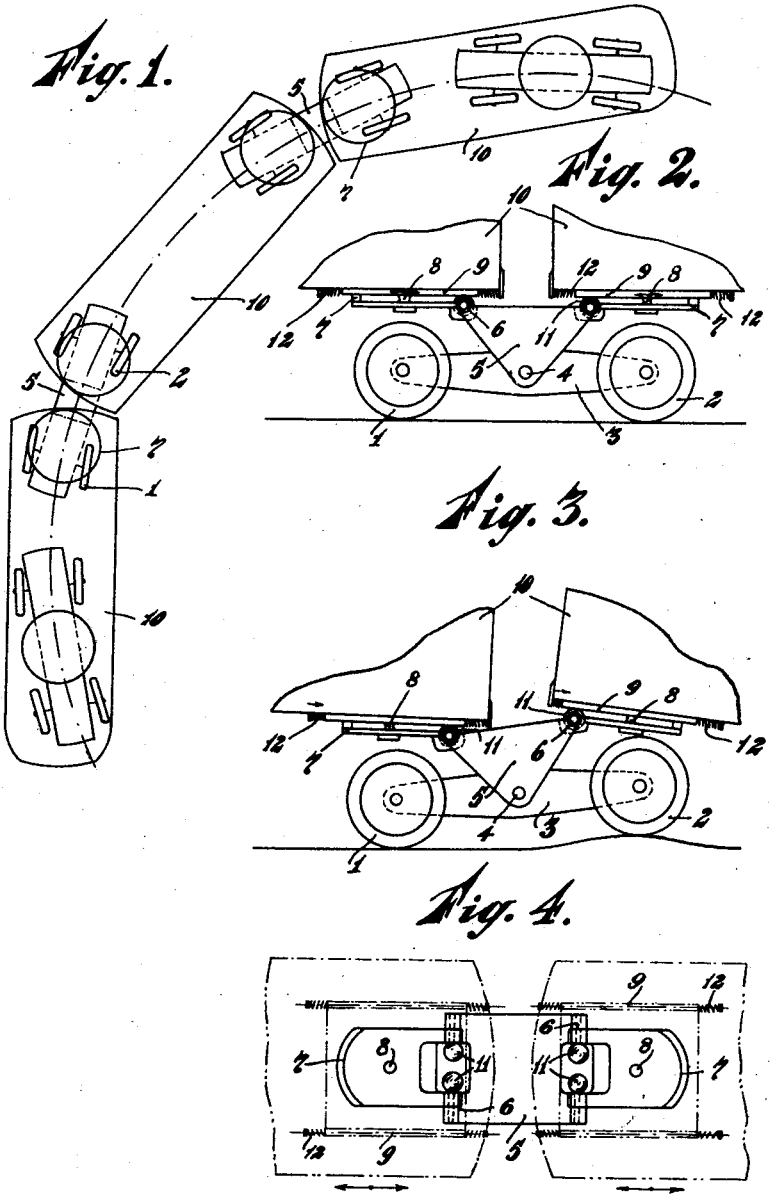
Inventor
H. W. Jonkhoff
by Langner, Parry, Card & Langner
Att'ys.

Patented Jan. 3, 1928.

1,654,814

UNITED STATES PATENT OFFICE.

HENRI WOUTER JONKHOFF, OF HILVERSUM, NETHERLANDS.

COMMON TRUCK FOR TWO LOADING PLATFORMS.

Application filed August 21, 1925. Serial No. 51,652.

The present invention relates to vehicles having trucks provided with wheels running on the ordinary road, or on rails. For road vehicles the truckwheels are preferably all steerable. The invention has for one of its main objects to compose tractor trains in such a manner that car-units are obtained in which in a simple and effective manner the location of the central point of connection between succeeding loading platforms is stabilized and which can be manufactured at relatively low costs.

The invention consists chiefly in a common truck for two loading platforms, the said truck having at least two steerable wheels and having means whereby the two loading platforms to be partially carried by the common truck are adapted to rock independently from each other. These and other objects and features of the invention will be more fully understood with reference to the accompanying drawings on which Fig. 1 is a plan view of a car-unit in a curve the unit being composed of two common trucks each carrying the ends of two adjacent or succeeding loading platforms, and two motor trucks, carrying the outer extremities of the front and the rear platform.

Fig. 2 is a side elevation, partially a section of a portion of two loading platforms supported on a common truck.

Fig. 3 is a side elevation, partially a section of the same embodiment, however with the parts in other positions.

Fig. 4 a bottom view of a portion of a common truck.

Referring to Figures 2-4, the common truck is provided with two steerable front wheels 1 and two steerable rear wheels 2. 3 is the chassis connecting the wheelaxles of the truck. To the said chassis is centrally, at 4, pivoted a base piece 5 of triangular form, to which is hinged at the left and at the right a turntable 7. The hinges 6 are more clearly shown in Fig. 4. To the turn tables 7 are rotatably connected by king bolts 8 (Fig. 4) plates 9, adapted to slide in suitable guideways of the loading platforms 10 in the longitudinal direction of the latter. The base-piece 5 is further provided at the top between the hinges 6 with a ball bearing 11 supporting the adjacent ends of the two plates 9 (Figs. 2 and 3).

It appears from Fig. 3 that the two loading platforms are rockable independently from each other and from the common truck 3. Further the distance between the ends of the platforms may vary. It will also be clear that if one single turntable is rockable instead of each turntable, the loading platforms are still rockable independently from each other but then one of the platforms is not rockable with respect to the truck.

In Fig. 4 springs 12 are shown, serving as a shock absorbing means and as a means for returning the platforms to their central position.

When using car-units of the above type on rails then the wheels of the trucks need not be steerable. For railway traffic the common truck may have means, whereby the two loading platforms are adapted to rock independently from each other, and means, whereby the distance between the ends of these platforms mutually, or between a platform-end and the centre of the truck is variable. Further shock absorbing means, for instance springs, may be provided, limiting the relative sliding movement.

What I claim is:

1. A common truck for supporting the adjacent ends of two loading platforms which are adapted to "track", including dirigible truck-supporting wheels, turntables carried by the truck upon which the ends of said platform are slidably mounted in their longitudinal directions, said truck being rockable with respect to said platforms.

2. A common truck for supporting the adjacent ends of two loading platforms which are adapted to "track", including dirigible truck-supporting wheels, a chassis carried thereby, a base rockably supported upon said chassis on a transverse axis, turntables rockably carried by said chassis, parts thereof being rotatable, the ends of said platforms being carried by said rotatable parts slidably in their longitudinal directions.

In testimony whereof I affix my signature.

HENRI WOUTER JONKHOFF.